(12) United States Patent
Mukai et al.

(10) Patent No.: US 6,903,305 B2
(45) Date of Patent: Jun. 7, 2005

(54) WELDING WIRE FEEDER

(75) Inventors: Yasushi Mukai, Osaka (JP); Wataru Takahashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 52 days.

(21) Appl. No.: 10/380,890

(22) PCT Filed: Jul. 26, 2002

(86) PCT No.: PCT/JP02/07615
§ 371 (c)(1),
(2), (4) Date: Jul. 25, 2003

(87) PCT Pub. No.: WO03/011509
PCT Pub. Date: Feb. 13, 2003

(65) Prior Publication Data
US 2004/0011776 A1 Jan. 22, 2004

(30) Foreign Application Priority Data
Jul. 30, 2001 (JP) .......................... 2001-229196

(51) Int. Cl.$^7$ .............................................. B23K 9/12
(52) U.S. Cl. ................................................. 219/137.7
(58) Field of Search ...................... 219/137.2, 137.7; 228/247, 256, 41; 242/554.5

(56) References Cited

U.S. PATENT DOCUMENTS

| | | | |
|---|---|---|---|
| 3,293,477 A | * 12/1966 | Lobosco | 314/69 |
| 3,586,221 A | * 6/1971 | Rosen | 226/1 |
| 3,630,425 A | * 12/1971 | Wilkens | 226/108 |
| 3,693,858 A | * 9/1972 | Araya et al. | 226/108 |
| 4,107,508 A | * 8/1978 | Izumi et al. | 219/137.7 |
| 4,206,862 A | * 6/1980 | DaCosta | 226/178 |
| 4,404,457 A | * 9/1983 | Rokujio et al. | 219/137.2 |
| 5,370,290 A | * 12/1994 | Gilliland | 226/108 |
| 5,521,355 A | * 5/1996 | Lorentzen | 219/137.7 |

FOREIGN PATENT DOCUMENTS

| | | | |
|---|---|---|---|
| JP | 50-25425 | | 8/1975 |
| JP | 57068274 A | * | 4/1982 |
| JP | 57081968 A | * | 5/1982 |
| JP | 58122181 A | * | 7/1983 |
| JP | 02-255273 | | 10/1990 |
| JP | 05118345 A | * | 5/1993 |
| JP | 05-118345 | | 5/1993 |
| JP | 11-156543 | | 6/1999 |
| JP | 11156543 A | * | 6/1999 |

OTHER PUBLICATIONS

Japanese International Search Report for PCT/JP02/07615, dated Nov. 12, 2002.
English translation of Japanese International Search Report for PCT/JP02/07615, dated Nov. 12, 2002.

* cited by examiner

Primary Examiner—Kevin P. Kerns
(74) Attorney, Agent, or Firm—RatnerPrestia

(57) ABSTRACT

A push-pull welding wire feeder includes plural wire feeding units provided in a wire feeding passage extending from a welding wire magazine, in which a roll of welding wire is accommodated, via a wire guide tube to a welding torch. At least one of the wire feeding units includes a torque limiter provided in a driving transmission system thereof for transmitting a driving force from a driving source to the welding wire. Accordingly, the welding wire feeder can steadily convey the welding wire even at acceleration or deceleration while allowing the welding wire to be bent, thus contributing to favorable result of its welding operation.

4 Claims, 3 Drawing Sheets

WELDING WIRE FEEDER

THIS APPLICATION IS A U.S. NATIONAL PHASE APPLICATION OF PCT INTERNATIONAL APPLICATION PCT/JP02/07615.

TECHNICAL FIELD

The present invention relates to a welding wire feeder for feeding a welding wire to a welding torch.

BACKGROUND ART

In arc welding, it is necessary to stabilize a welding arc in order to maintain high quality of the welding. For the purpose, a welding wire has to be accurately fed to a welding station so that a length of the welding arc is constant.

In case that arc welding employs aluminum which is too soft to be conveyed by a push feeder, or utilizes a long passage for feeding the wire, a push-pull welding wire feeder having plural wire feeding units is provided along the passage. The wire feeding unit generally includes a pair of rollers which hold the wire between them and are driven by a driving source, an electric motor.

For steadily feeding the wire with the push-pull welding wire feeder, a pulling speed for pulling the wire at a pull-end feeding unit and a pushing speed for pushing the wire at a push-end feeding unit has to be precisely equal to each other.

In practice, there may however be a small difference in the speeds between the wire feeding units. The small difference is accumulated time to time and finally interrupt the welding.

Japanese Patent Publication No. 50-25425 discloses that two wire feeding units are determined as a master unit and a slave unit, respectively. The master unit is driven by a motor, and is electrically controlled to operate at a constant speed for feeding the wire determined according to requirements of the welding. The slave unit is controlled at constant torque operation.

Japanese Patent Laid-open Publication No. 11-156543 discloses that a push-end feeding unit is equipped with a pneumatic motor which itself has constant torque characteristics for performing the constant torque operation easily.

Each of the conventional push-pull welding wire feeders allows the wire to be steadily conveyed with the slave wire feeding unit controlled at a constant torque, while the wire feeding speed maintained in constant, hence providing proper welding quality.

However, when the wire feeding speed in the conventional wire feeders is periodically changed, e.g. is accelerated and decelerated for producing scale-like welding beads or at the start and end of the welding operation, the master wire feeding unit driven may be loaded irregularly due to a delay in an operation of the slave wire feeding unit. This causes the wire feeding to be hardly consistent, thus making the welding quality deteriorate. Specifically, the slave wire feeding unit controlled at a constant torque causes a force for feeding the wire to be smaller or larger than its desired level since an inertia force in its electric or pneumatic motor as the driving source creates an acceleration torque, i.e., a frictional or viscous torque. This causes the wire to be bent between the master and slave wire feeding units, which is significantly disadvantageous.

The disadvantageous bending of the welding wire often occurs when the wire is jammed or fused down at the tip end of the welding torch. The disadvantageous bending of the wire is caused also-at the slave wire feeding unit located at the push-end to be controlled at a constant torque.

This will result from the facts that the wire is weaker in bending strength than in tensile strength and that the slave wire feeding unit controlled at constant torque operation can hardly stop at once due to the inertia at its driving source.

SUMMARY OF THE INVENTION

A welding wire feeder conveys a welding wire from a welding wire magazine to a welding torch. The welding wire feeder includes a wire feeding passage provided between the welding wire magazine and the welding torch where the welding wire is conveyed, plural wire feeding units provided in the wire feeding passage, a driving source provided at one of the wire feeding units for generating a driving force to actuate the one of the wire feeding units, and a torque limiter for transmitting the driving force to the welding wire.

The push-pull welding wire feeder conveys the wire stably even when the conveying is accelerated and decelarated.

DESCRIPTION OF THE PREFERRED EMBODIMENT

Figure 1:
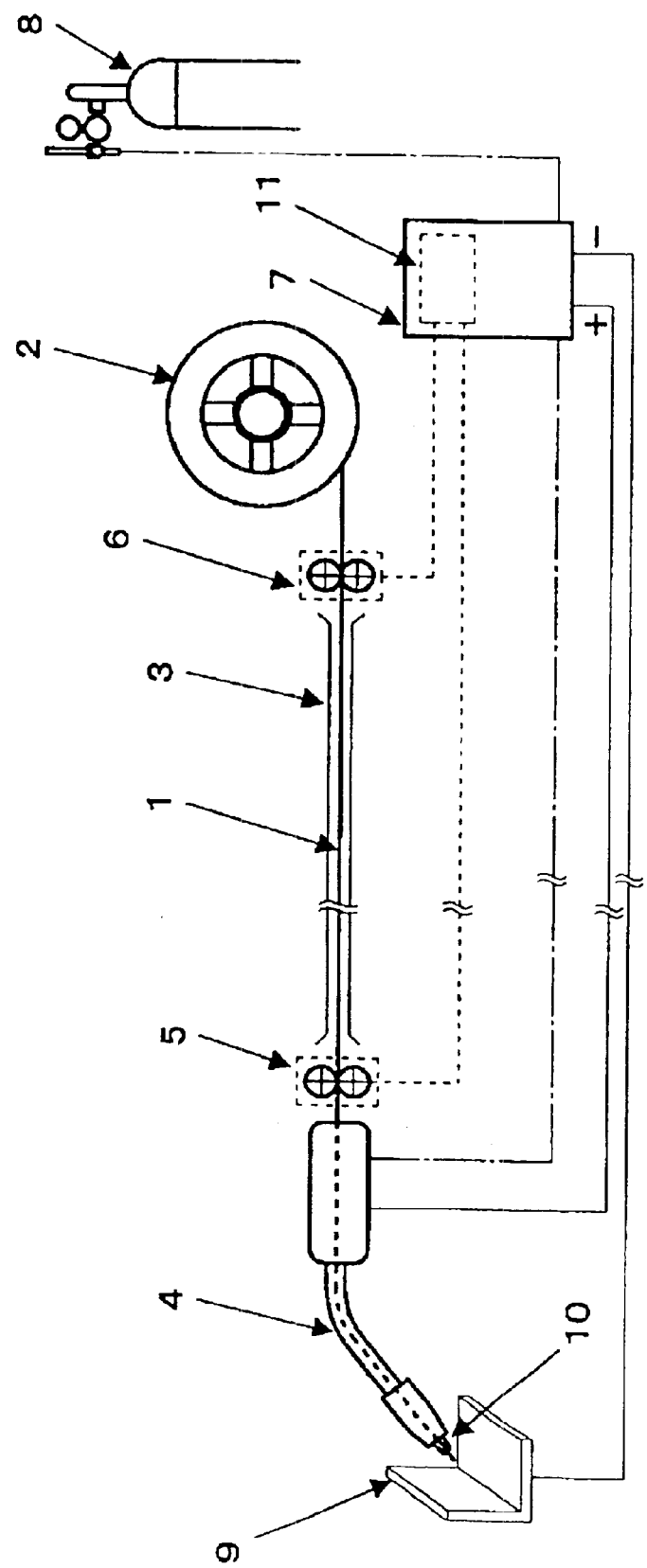
FIG. 1 is a schematic view of a welding wire feeder according to an exemplary embodiment of the present invention.

FIG. 1 is a schematic view of a welding wire feeder according to an exemplary embodiment of the present invention. A welding wire magazine 2 accommodates a roll of welding wire 1 wound. The welding wire feeder is disposed in a wire feeding passage extending from the welding wire magazine 2 via a wire guide tube 3 to a welding torch 4, and is a push-pull wire feeder including a pull-end feeding unit 5 located close to the welding torch 4 and a push-end feeding unit 6 located close to the welding wire magazine 2.

For shielding a welding point, shielding gas, i.e., inert gas contained in a gas container 8 is ejected from a top end of the welding torch 4 towards a workpiece 9 to be welded for shielding a portion to be welded. An arc welding source 7 applies a desired voltage between the welding wire 1, which is a consumed electrode, and the workpiece 9 at a contact tip 10 of the welding torch 4 to produce arc discharge between the welding wire 1 and the workpiece 9 for welding.

The pull-end feeding unit 5 is controlled by a wire feeding controller 11 so that the welding wire 1 is fed to the welding torch 4 at a predetermined speed defined by welding requirements. The push-end feeding unit 6 includes a torque limiter (not shown) for conveying the welding wire 1 to the pull-end feeding unit 5 at a constant force.

This allows the push-end feeding unit 6 to have a reduced resistance against its feeding operation resulting from drawing of the welding wire 1 from the welding wire magazine 2 or from the friction between the welding wire 1 and an inner wall of the wire guide tube 3, and hence, to assist the pull-end feeding unit 5 to accurately maintain a speed of the welding wire 1.

Figure 2:
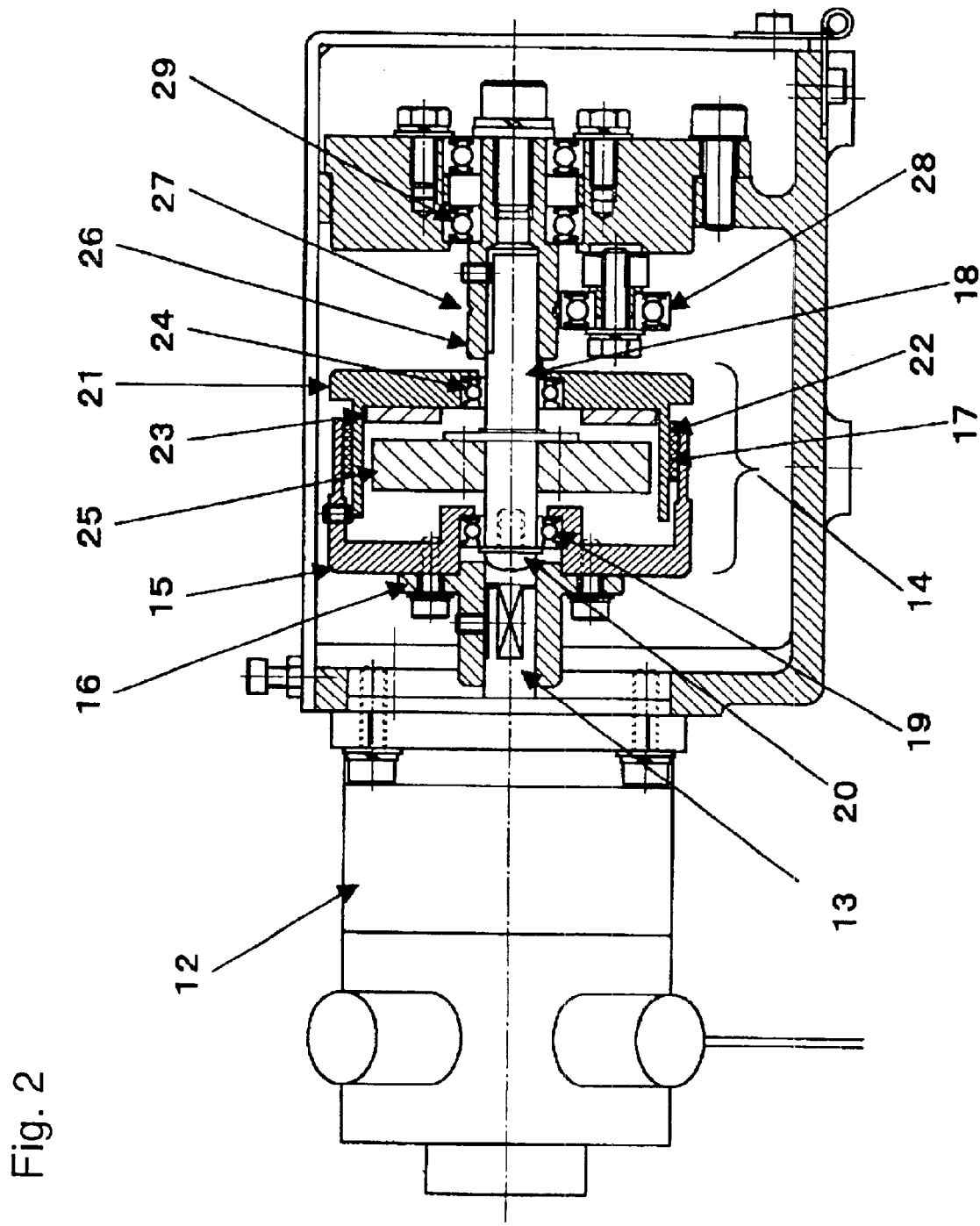
FIG. 2 is a cross sectional view of a push-end feeding unit in the welding wire feeder according to the embodiment.

FIG. 2 is a cross sectional view the push-end feeding unit 6 illustrated in FIG. 1 for showing details of the interior arrangement of the unit 6. The torque limiter in the push-end feeding unit 6 has a magnetic coupling arrangement provided across a power transmission path thereof.

A shaft 13 of an electric motor 12 functioning as a driving source in the push-end feeding unit 6 is linked with a joint 16 to an input-side case 15 of the torque limiter 14.

The input-side case 15 is made of non-magnetic material having a cylindrical shape with a bottom. A female thread 17 is provided in the inner wall of the input-side case 15. Also, a bearing 19 is provided at the center of the bottom of the input-side case 15 for rotatably supporting an output shaft 18. As an outer race of the bearing 19 is axially retained to the input-side case 15, an inner race of the bearing 19 is tightened with a screw 20 to the output shaft 18. This arrangement prevents the output shaft 18 from axial movement.

Similar to the input-side case 15, an output-side case 21 is made of non-magnetic material having a cylindrical shape with a bottom. A male thread 22 is provided on an outer wall of the cylindrical shape of the output-side case 21 and closely engaged with the female thread 17 of the input-side case 15.

A hysteresis material plate 23 having a disk shape is fixed on the inner wall of the bottom of the output-side case 21. A bearing 24 is provided at the center of the bottom of the output-side case 21 for rotatably supporting the output shaft 18 together with the bearing 19 of the input-side case 15.

On the output shaft 18, a multi-pole permanent magnet plate 25 thereon having a disk form and being radially magnetized is provided. The plate 25 faces the hysteresis material plate 23 on the input-side case 15 as being distanced by a magnetic field gap from the plate 23. A feed roller 26 having a groove 27 provided therein is mounted on the output shaft 18 so that the welding wire 1 is conveyed between the feed roller 26 and a press roller 28 in a direction perpendicular to the sheet of the figure.

The feed roller 26 is rotatably supported with a bearing 29 while the press roller 28 remains urged towards the feed roller 26 by a spring (not shown).

An operation of the push-end feeding unit 6 of the embodiment for conveying the welding wire 1 at a constant torque with no electrical control will be explained referring to FIGS. 1 and 2.

First, the electric motor 12 as the driving source in the push-end feeding unit 6 is energized before the pull-end feeding unit 5 feeds the welding wire 1. A driving power of the electric motor 12 is transmitted via the shaft 13 and the joint 16 to the input-side case 15 and the output-side case 21 which start to rotate as the electric motor 12 rotates.

According to above, the disk-form hysteresis material plate 23 fixed on the inner wall of the bottom of the output-side case 21 starts to rotate. This rotation generates a relative rotating motion between the hysteresis material plate 23 and the multi-pole permanent magnet disk 25 mounted on the output shaft 18. Being magnetically induced by the multi-pole permanent magnet disk 25, the hysteresis material plate 23 transmits a hysteresis torque which does not depend on a direction and a speed of rotation, and the torque is received by the output shaft 18.

This operation enables the feed roller 26 mounted on the output shaft 18 to convey the welding wire 1 sandwiched between the groove 27 and the press roller 28 towards the pull-end feeding unit 5 at a constant force. As explained, the constant force for conveying the welding wire 1 of the embodiment is provided by the torque limiter 14 having a magnetic coupling arrangement but not by an operation of electric torque control. Accordingly, the rotating speed of the electric motor 12 can arbitrarily be determined as long as the speed is larger than the maximum speed of feeding the welding wire 1. While the torque is provided enough to generate the maximum of the conveying force, the start and stop of the electric motor 12 can simply be controlled by turning on and off a constant voltage supply with no specific controller. As the result, the welding wire feeder of the embodiment can be simplified in the overall control system similarly to a pneumatic motor having constant torque characteristics.

The constant torque which does not depend on the direction and speed of the rotation is provided by the torque limiter 14 which has a simple magnetic coupling arrangement while no sliding members are involved, thus improving an operation reliability.

An operation of the push-end feeding unit 6 for adjusting the force for conveying the wire at an optimum rate will be explained.

The resistance to the conveying force may vary according to a stress generated when the welding wire 1 is drawn out of the welding wire magazine 2 and to a friction between the welding wire 1 and the inner wall of the wire guide tube 3. Specifically, the resistance to the conveying force may be determined by the length and the degree of bent of the wire guide tube 3 and the type of the welding wire magazine 2.

According to the embodiment, the transmitted torque and the wire conveying force in the push-end feeding unit 6 are adjusted by controlling the relative rotating position or phase between the input-side case 15 and the output-side case 21. When the positional relationship between the cases 15 and 21 is changed with the threads 17 and 22, the gap in the magnetic field between the hysteresis material plate 23 and the multi-pole permanent magnet disk 25 varies. According to experiments, when the resistant (Fw) to the conveying force under static conditions along the wire feeding passage, the conveying force (Fp) in the push-end feeding unit, and a limit (Fb) of bending strength of the welding wire are adjusted to satisfy $0.8Fw<Fp<Fb$, an optimum result was given, In the adjustment, while the pull-end feeding unit 5 remains idle for applying no pressure to the welding wire 1, the push-end feeding unit 6 is actuated to convey the welding wire 1. Then, the conveying force gradually declines and a desired level of the force is given just when the conveying of the welding wire 1 stops. In other words, the welding wire 1 is steadily conveyed when $Fw \cong Fp$, and the conveying force can arbitrarily be adjusted easily at site.

If the above condition is not established due to, for example, an excessively-large resistance to the conveying force as compared with the bending strength, an entire feeding system has to be modified.

Acceleration and deceleration during the conveying of the welding wire 1, that is, the start and end of the welding operation will be explained with referring to FIGS. 1 and 2.

At the start of the welding operation, the pull-end feeding unit 5 is actuated to increase the speed of conveying the welding wire 1 up to its desired speed defined by a welding condition.

A method using the constant torque characteristics of a pneumatic motor as the driving source and a method using electrical control for producing a constant torque require to accelerate the driving source itself of which the inertia is largest together with the welding wire 1. This causes the torque to be consumed for accelerating the driving source, hence retarding the acceleration of the push-end feeding unit 6 against the acceleration of the welding wire 1 at the pull-end feeding unit 5. Thus, the operation of the push-end feeding unit 6 may not assist to the pull-end feeding unit 5 but provides the unit 5 with a load.

According to the embodiment, the electric motor 12 as the driving source in the push-end feeding unit 6 has been energized before the welding wire 1 is fed forward by the pull-end feeding unit 5 at the start of the welding operation. Specifically, most components of a rotating system of the push-end feeding unit 6 including the joint 16, the input-side case 15 and the output-side case 21 of the torque limiter 14, and the hysteresis material plate 23 rotates before the feeding operation.

The components accelerated together with the welding wire 1 at the start of the welding operation includes only the output shaft 18, the multi-pole permanent magnet plate 25 mounted on the output shaft 18, and the feed roller 26. The inertia of the accelerated components can be reduced to be smaller than that of the rotating drive system of the conventional feeder including the electric motor. Accordingly, the push-end feeding unit 6 can be improved in the response, thus conveying the welding wire 1 steadily even during the acceleration.

Even if the welding wire 1 accidentally stops being fed the tip end of the welding torch due to jamming or fusing, the conveying operation of the push-end feeding unit 6 having the inertia in the rotating drive system, which is substantially small, can instantly be canceled. Since the conveying force is set to a predetermined level which is lower than the bending strength of the welding wire 1, the welding wire 1 is prevented from being forced into the wire guide tube 3 and bent. This advantage can equally be obtained if the feeding speed of the welding wire 1 is periodically changed for producing scale-like beads of welding. According to the embodiment, the welding wire 1 is conveyed stably during acceleration and deceleration period, thus contributing to favorable result of the welding. The push-pull welding wire feeder of the embodiment can hence be improved as permitting no bending of the welding wire 1.

Also, the welding wire feeder of the embodiment includes the wire guide tube 3 having an inner diameter three time greater than the outer diameter of the welding wire 1. This arrangement allows the wire 1 to be conveyed accurately, thus increasing an operating life of the wire guide tube 3. The advantage obtained by the large inner diameter of the wire guide tube 3 will be explained in more detail referring to FIGS. 3A to 3C.

Figure 3A:
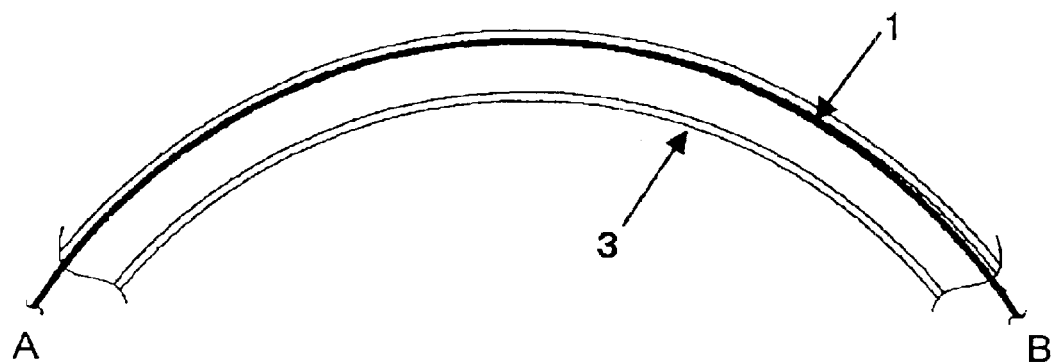
FIGS. 3A to 3C are cross sectional views of a wire guide for showing behaviors of the welding wire along the wire guide in the welding wire feeder according to the embodiment.
Figure 3B:
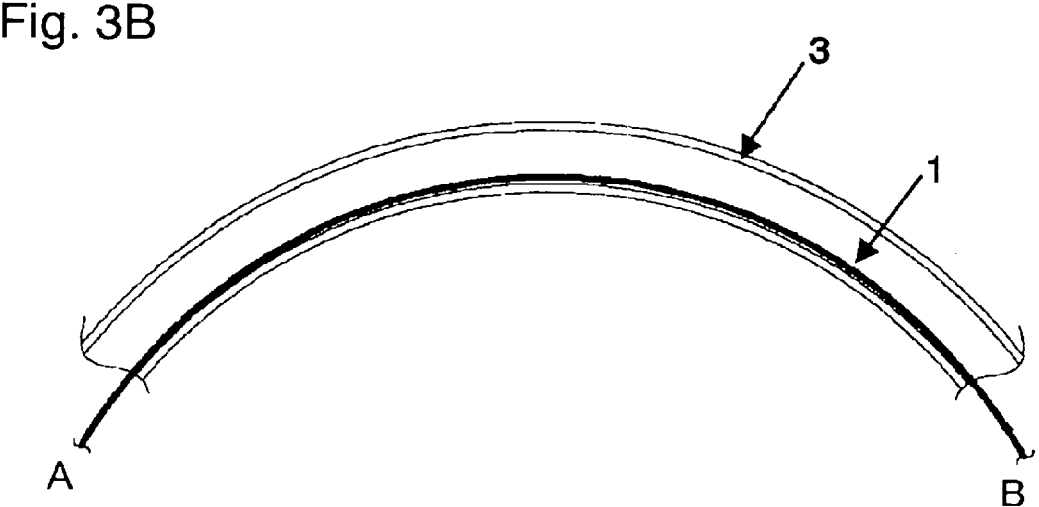
Figure 3C:
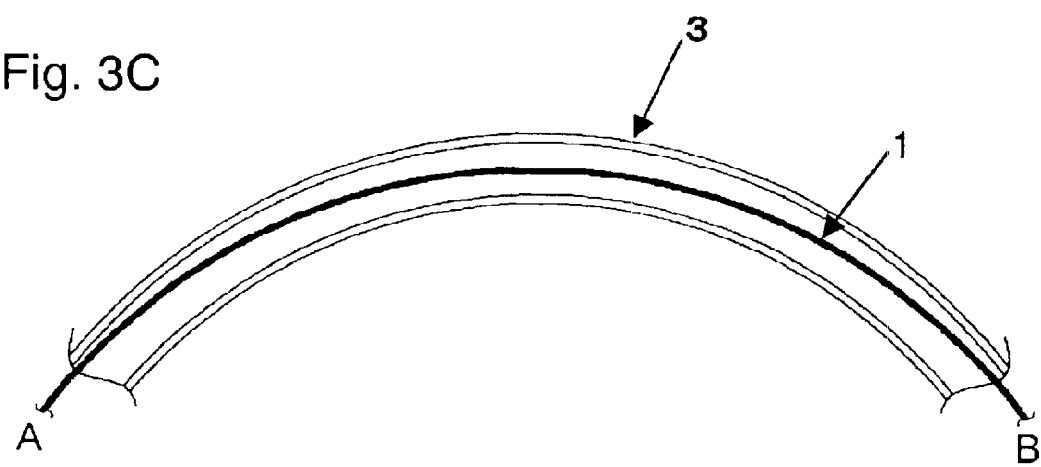

FIGS. 3A to 3C are schematic cross sectional views of the wire guide tube 3 for showing behavior of the welding wire 1 in the tube 3.

Throughout FIGS. 3A to 3C, the push-end feeding unit 6 (not shown) is located at side A, while the pull-end feeding unit 5 (not shown) is located at side B. The welding wire 1 is conveyed from side A to side B.

FIG. 3A illustrates the welding wire 1 running along the longest route in the wire guide tube 3. Upon starting the welding operation, the push-end feeding unit 6 is first actuated for conveying forward the welding wire 1 towards the pull-end feeding unit 5 before the pull-end feeding unit 5 starts feeding the welding wire 1.

FIG. 3B illustrates the welding wire 1 running along the shortest route in the wire guide tube 3. This may occur in the conventional feeder when an operation of the push-end feeding unit 6 is significantly retarded during the acceleration and fails to catch up the feeding operation of the pull-end feeding unit 5. This situation causes the resistance to the feeding operation in the pull-end feeding unit 5 to abruptly be increased due to a friction in the wire guide tube 3 and the retarded operation of the push-end feeding unit 6. Thus, the conveying of the welding wire 1 is fluttered, and a quality of the welding declines.

Since the inertia in the rotating drive system of the embodiment which is accelerated and decelerated together with the welding wire 1 is significantly smaller than that of the conventional feeder, any delayed operation of the push-end feeding unit 6 is negligible in common welding operations. Strictly speaking, a delay operation due to the inertia in the rotating drive system of the push-end feeding unit 6 exists and is not negligible when the welding wire 1 is rapidly accelerated and decelerated.

FIG. 3C illustrates the welding wire 1 just starting being driven or abruptly accelerated by the pull-end feeding unit 5 to commence the welding operation. At this moment, though the operation of the push-end feeding unit 6 for acceleration is retarded, the welding wire 1 remains free in the wire guide tube 3, and the resistance to the conveying operation and a change of the resistance is small, thus being forwarded stably. The inner wall of the wire guide tube 3 has a reduced weariness, thus increasing an operating life of the tube 3. More specifically, even if the push-end feeding unit 6 is retarded for the acceleration, the welding wire 1 can steadily be conveyed in a path ranging from the longest path shown in FIG. 3A to the shortest path shown in FIG. 3B. The difference between the longest path and the shortest path is utilized as a buffer for absorbing any delay in the accelerating operation of the push-end feeding unit 6.

The difference between the longest path and the shortest path which serves as the buffer in the wire guide tube 3 may vary according to the entire length of the wire conveying path and the inner diameter and curvature of the wire guide tube 3. According to actual usage, in the welding wire feeder with the push-end feeding unit of the embodiment, the difference functions sufficiently as the buffer for acceleration of the welding wire 1 upon being three times greater than the outer diameter of the welding wire 1.

In the conventional feeder where the inertia in the rotating drive system is large enough to induce a delay of operation during the acceleration or deceleration, if the inner diameter of the wire guide tube 3 is widened for offsetting the delay, the bending strength of the welding wire 1 decline. Specifically, the bending strength of the welding wire 1 becomes smaller than the resistance to the conveying operation. As the result, the conventional feeder is inferior to that of the embodiment equipped with the foregoing push-end feeding unit having a reduced inertia in the rotating drive system.

The welding wire feeder of the embodiment allows the push-end feeding unit 6 to be used as a wire feeder for drawing and conveying the welding wire 1 from the welding wire magazine 2 along the wire guide tube 3 to the welding torch 4. Accordingly, as the welding operation has a reduced stopping time, thus improving efficiency. The conveying force (Fp) of the push-end feeding unit 6 of the embodiment is set smaller than the bending strength (Fb) of the welding wire 1. This allows the welding wire 1 to be steadily conveyed to the welding torch 4 without bending even if its movement suffers from a step portion of or any other obstacle in the wire guide tube 1.

INDUSTRIAL APPLICABILITY

A push-pull welding wire feeder of the present invention steadily conveys a welding wire even when a feeding speed is periodically changed for producing scale-like welding beads or at the start or end of the welding operation, thus allowing not to bend the wire. The feeder thus creates favorable result of the welding.

What is claimed is:

1. A welding wire feeder for conveying a welding wire from a magazine for accommodating a welding wire therein to a welding torch, said welding wire feeder comprising:
   a wire feeding passage provided between said magazine and said welding torch, for conveying said welding wire therein;
   a plurality of wire feeding units provided in said wire feeding passage, one of said wire feeding units is located closest to said welding wire magazine out of said wire feeding units;
   a driving source provided in said one of said wire feeding units for generating a driving force to actuate said one of said wire feeding units;
   a torque limiter for transmitting said driving force to said welding wire, the torque limiter is adjustable in a torque to be transmitted; and
   the torque produced by the torque limiter is so that a conveying force (Fp) of said one of said wire feeding units, a resistance (Fw) to the conveying force at a static state in said wire feeding passage, and a maximum force (Fb) of bending of said welding wire satisfies the relation of 0.8Fw<Fp<Fb.

2. The welding wire feeder according to claim 1, wherein said torque limiter comprises a magnetic coupler including a multi-pole magnet plate and a hysteresis material plate, said magnetic coupler transmitting a constant torque with the use of hysteresis loss generated by relative rotation between said multi-pole magnet plate and said hysteresis material plate.

3. The welding wire feeder according to claim 1, wherein said one of said wire feeding units is located closer to said welding wire magazine than others of said wire feeding units, and functions as a feeder for conveying said welding wire from said welding wire magazine to said welding torch.

4. The welding wire feeder according to claim 1, wherein said wire feeding passage comprises a wire guide tube for conveying said welding wire therein, said tube having an inner diameter three times larger than an outer diameter of said welding wire and being located between said wire feeding units.

* * * * *